United States Patent Office 3,029,089
Patented Apr. 10, 1962

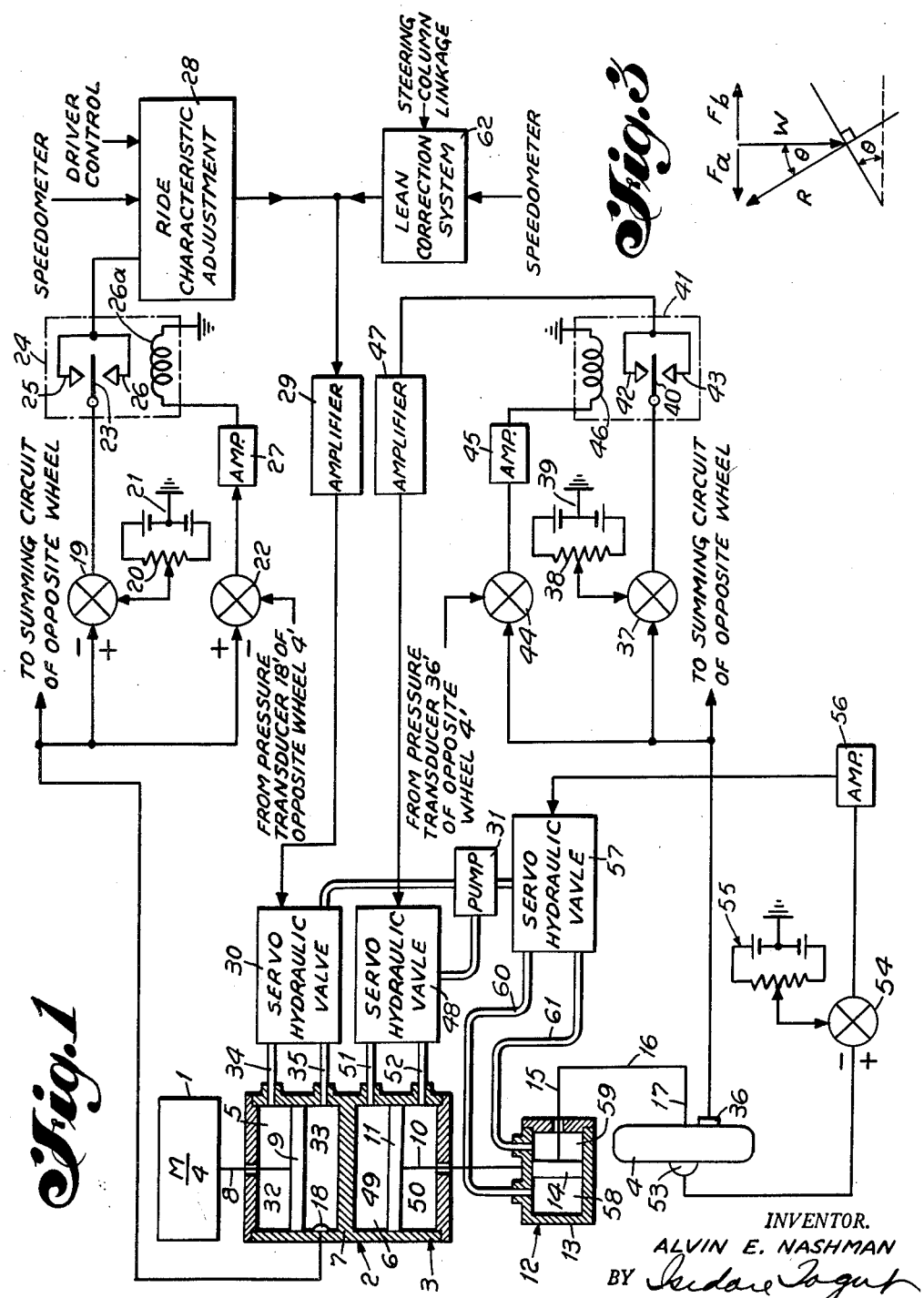

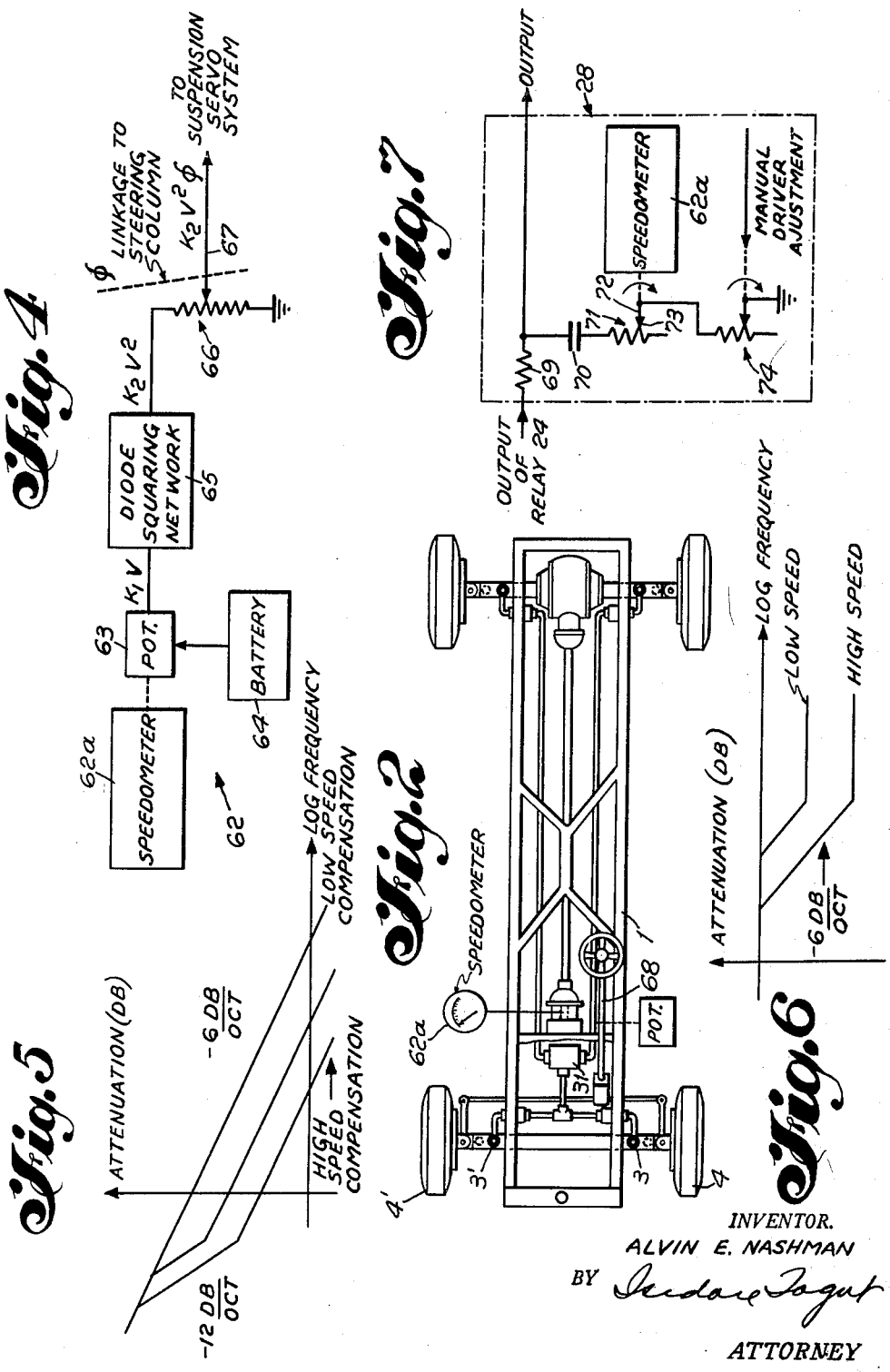

3,029,089
VEHICLE SUSPENSION AND STABILIZING SYSTEM
Alvin E. Nashman, New York, N.Y., assignor to International Telephone and Telegraph Corporation, Nutley, N.J., a corporation of Maryland
Filed May 7, 1959, Ser. No. 811,622
16 Claims. (Cl. 280—124)

This invention relates to a suspension and stabilizing system for automotive vehicles and more particularly to a suspension system for maintaining the body of the vehicle in a substantially stable condition.

Suspension systems for vehicles and particularly for automobiles are theoretically designed to give the maximum in smooth riding for the passenger regardless of the roughness of the road over which the vehicle is traveling. Many schemes have been offered and incorporated in vehicles to provide this ideal smooth ride but it is apparent that much room for improvement still remains. Means have been suggested for correcting unbalance in automobile suspension which is caused by turning of the vehicle or by road irregularities that depend upon differential pressures produced in the hydraulic suspension to produce counteracting fluid flow to equalize the pressures and to restore the vehicle balance. Sensing means have been suggested, such as pendulums which are moved from an equilibrium condition by unbalancing forces and thereupon operate valves or other adjusting devices to equalize the pressures in the cylinders of hydraulic suspension in an effort to provide a level ride. However, these arrangements are either open loops with respect to the passenger compartment, and/or are subject to external accelerations and are generally slow in sensing and in providing the necessary counteracting forces so that a great deal of the unbalance which is sought to be corrected still remains after the correction has been attempted.

In the copending application of A. M. Klein, filed December 10, 1958, Serial No. 779,492, there is described a suspension system utilizing hydraulic suspension means and a servo control system whereby pressure in the hydraulic cylinder is maintained constant despite motions of the wheel over bumpy road surfaces. In essence, this is a spring which through feedback action retains a constant force for moderate deflections regardless of its expansion or compression. No net forces are transmitted to the passenger compartment of the vehicle under these conditions and the ride is greatly improved. At the extremes of allowable wheel travel, servo action must be inhibited and the hydraulic pressure allowed to build up under severe compressions and drop off at close to full allowable expansion. In the copending application of G. Rabow, filed November 3, 1958, Serial No. 771,557, another approach to servo control of vehicle body motion is disclosed. In this case, the transducer is an accelerometer mounted on the body for directly sensing the effects of road motion on the car. This system, when combined with the automatic leveling system operating through the hydraulic servo actuator, also yields an effective zero slope in the spring rate characteristics and thus improves the ride.

The improved systems described in the two copending applications achieve optimum ride improvement as long as the automobile wheels stay on the road. Under certain conditions, however, as when going over a sharp pothole or a series of bumps, the wheels have a tendency to leave the road surface. This results in poor steering, possible skidding and, in some instances, motions of the passenger compartment. When the wheel leaves the ground, spring suspension systems tend to push wheels and body apart. The ratio of sprung to unsprung weight determines the relative motions that result. When the mass of the body is large compared to the mass of the wheel assembly, the greater part of the total motion will act to move the wheels closer to the ground. For this reason, automobile designers strive to achieve high ratios of sprung to unsprung weight. In the conventional steel spring suspension, at the instant that the vehicle's wheels leave the ground, the compressed spring supplies a force to the body exactly equal to the weight supported prior to reaching the pothole. This assumes smooth road conditions prior to reaching the road discontinuity. As the spring expands, the force supporting the body's weight diminishes by $KX_1$, where K is the spring constant and $X_1$ the wheel's displacement. In essence, it is the reaction force of the wheel accelerating towards the ground which provides a force to maintain the passenger compartment in its initial level condition. Because the force available to accelerate the wheels is diminished by $KX_1$, the reaction force is diminished and body motions result. Translation, pitch and roll of the passenger compartment result. Furthermore, because the force available to bring the wheels into contact with the ground is limited, the time during which the wheels are out of ground contact is relatively large. This condition, especially in the case of the wheels through which motive power is applied results in poor handling and, in wet road conditions, skidding.

The constant pressure system disclosed in the A. M. Klein copending application referred to above behaves in better fashion than the conventional spring suspension. As long as the servo system operates to maintain constant force in the hydraulic cylinder, the reaction force on the body is always equal to the supported weight and there are no motions of the passenger compartment. In addition, the force available to accelerate the wheels to the ground is not diminished by the $KX_1$ term above and thus is larger than that force available in the conventional steel or air spring suspension. The accelerometer system has an essential behavior identical to the constant pressure system. If it were desired in the conventional system to use a larger force than the supported weight to drive the wheel into ground contact, the reaction force on the body would then be greater than the supported weight and the passenger compartment would then experience an upward acceleration. This invention provides an additional improvement over the conventional spring and air suspension.

It is an object of this invention to provide a suspension and stabilization system for vehicles that can apply larger forces to drive the wheel of the vehicle in ground contact without the resulting accelerations on the passenger compartment than are possible with the suspension systems described above.

It is another object to provide a suspension system for vehicles for stabilizing the vehicle when the vehicle is traveling over a curve in the road.

Still another object is a suspension and stabilization system for vehicles which will provide a means for electrically compensating, according to speed or at the will of the driver, the ride characteristics of the car according to the speed and the driver's will.

A feature of this invention is a suspension system for a vehicle for maintaining the body of the vehicle in a substantially stable condition during the operation thereof that includes for each wheel of the vehicle a member disposed intermediate the body and the wheel. A first variable suspension means is disposed between the body and this intermediate member and a second variable suspension means is disposed between the member and the wheel. Means are provided to sense changes in the displacement of the body and the wheel with respect to the intermediate member and means responsive to these changes exceeding given reference values apply forces to the suspension means counteracting the changes.

Another feature is that the first and second suspension means comprise hydraulic suspensions. A pressure transducer senses changes in the hydraulic force of the hydraulic suspension disposed between the body and the intermediate member and another pressure transducer senses changes in the air pressure of the tire of the wheel. Comparing means are coupled to the output of each of the transducers to compare the outputs with given reference values and servo means are provided responsive to the outputs of the comparing means to apply forces to each suspension which tend to counteract the changes.

A further feature is a suspension system for a vehicle for maintaining the body of the vehicle in a substantially stable condition during operation thereof and includes means for sensing the steering and speed of travel. In addition to the intermediate member disposed intermediate the body and each wheel, there is included separate hydraulic suspension means for the body and the wheel and means to sense changes in the displacement of said body and said wheel with respect to said intermediate member. Servo means responsive to these changes exceeding given reference values apply forces to the suspension means counteracting the changes. Means are coupled to the steering wheel column and the speed indication means to derive therefrom an output which is proportional to the square of the speed of the vehicle and the angular displacement of the steering column during the travel of the vehicle along a curve in the road and means to utilize this output to maintain the vehicle in a stable condition during the travel along the curve.

Still another feature is a suspension system for a vehicle for varying the ride characteristics of the vehicle and maintaining the vehicle body in a substantially stable condition during operation thereof at varying speeds and road conditions producing disturbing forces of varying frequencies on said vehicle. For each wheel of the vehicle there is a member disposed intermediate the body and the wheel which member includes separate hydraulic suspension means for the body and the wheel. Means are provided to sense changes in the displacement of the body and the wheel with respect to this member and means responsive to the changes exceeding a given reference value apply forces to the suspension means counteracting these changes. Means are coupled to the speed indication means and are also manually controllable by the drive of the vehicle to derive an output in response to the speed of the vehicle and the manual control which is proportional to a band of the disturbing frequencies which it is desired to counteract is applied to the means applying forces to maintain the vehicle in a stable condition during travel along the road under varying speed conditions.

The above-mentioned and other features and objects of this invention will become more apparent by reference to the following description taken in conjunction with the accompanying drawings, in which:

FIG. 1 is a block diagram of a suspension system for one wheel of a multi-wheel vehicle embodying this invention;

FIG. 2 is a plan view of the assembly of the frame of the vehicle to the wheels;

FIG. 3 is a diagram illustrating the forces acting on the vehicle during travel of the vehicle along the curve;

FIG. 4 is a block diagram of the circuitry required for stabilizing the vehicle during the travel along the curve;

FIG. 5 is a graph showing an overall open loop frequency response of a constant pressure system;

FIG. 6 is the network variation required to accomplish an overall change in equalization; and FIG. 7 is a schematic diagram of the circuitry required for adjustment of the ride characteristics of the vehicle.

Referring now to FIGS. 1 and 2, there is shown in simplified form a portion of the body 1 of a vehicle to which is coupled a hydraulic suspension device 2 composed of a member 3 which is disposed intermediate the body 1 and the wheel 4. The member 3 comprises two hollow cylinders 5 and 6 whose vertical axes coincide and which are separated from each other by a wall 7 which is an integral part of the member 3. A piston rod 8 couples a piston 9 disposed within the cylinder 5 to the body 1. A piston rod 10 couples a piston 11 disposed within the cylinder 6 to the wheel 4 by means of a second hydraulic device 12. The hydraulic device 12 comprises a hollow cylinder 13 in which the piston 14 is movable in a lateral direction in contrast to the pistons 9 and 11 which move in a vertical direction. A piston rod 15 couples the piston 14 to the wheel 4 by means of a connecting rod 16 and the wheel axle 17. A pressure sensitive transducer 18 is disposed in the cylinder 5 and is responsive to variations in the pressure of the hydraulic fluid therein. The output of the pressure transducer 18 is a fluctuating electrical voltage corresponding to the pressure fluctuations within the cylinder 5. The output of the pressure transducer 18 is coupled to a summing circuit 19 to which is also coupled a reference voltage which is obtained from a suitable point on a fixed resistance 20 to the terminals of which is coupled a source of electrical energy 21. This reference voltage is set at the correct level at which it is desired the hydraulic pressure and the suspension means should be maintained and when the output of the pressure transducer is at that level, no output of the summing circuit 19 will result. The function of the summing circuit 19 is to subtract the reference voltage output of the resistor 20 from the output of the pressure transducer 18 to obtain therefor a difference voltage or error voltage which is indicative of the amount of correction that is required to bring the hydraulic cylinder 5 to the correct operating level. The output of the pressure transducer 18 is also coupled to a second summing or subtracting circuit 22. To this summing circuit is coupled the output of the pressure transducer 18' of the opposite wheel 4'. The output of the summing circuit 19 is coupled to the armature 23 of a polar relay 24 having two output contacts 25 and 26 which are coupled together to provide a common output. The polar relay 24 is also provided with a middle or null position so that no output can be produced from the polar relay 24 if the voltage fed to the energizing coil 26a of the relay 24 via the amplifier 27 from the output of the summing circuit 22 is insufficient to cause it to operate. The output of the polar relay 24 is coupled to a ride characteristic adjustment unit 28 which will be described later on. The output of the adjustment unit 28 is fed to an amplifier 29 and the output thereof is fed into a servo hydraulic valve 30. A pump 31 supplies the servo hydraulic valve 30 with the pressurized hydraulic fluid and the hydraulic output of the valve 30 is coupled to the compartments 32 and 33 of the cylinder 5 by means of passages 34 and 35. The pressure transducer 18 together with the electrical units described and the servo hydraulic valve constitute a feedback constant pressure loop which acts to reduce the effects of vertical acceleration forces on the body of the vehicle.

A second pressure transducer 36 is coupled to the tire of the wheel 4 to sense any pressure variations in the tire. The output of the pressure transducer 36 is coupled to a summing circuit 37 to which is also coupled the outputs of a fixed resistance 38 fed by a battery 39 which determines the reference voltage. The output of the summing circuit 37 is coupled to the armature 40 of the polar relay 41 similar to the relay 24 which has two contacts 42 and 43 which are coupled together to give a common output. The output of the pressure transducer 36 is also coupled to a summing circuit 44 that is also supplied with the output of the pressure transducer 36' of the opposite wheel 4'. The output of the summing circuit 44 is coupled to an amplifier 45 and the output of the amplifier 45 is fed to the control coil 46 of the relay 41. The operation of the relay 41 is similar to the operation of relay 24. The output of relay 41 is coupled to an amplifier 47 that is coupled to a servo hydraulic valve 48 of the same type as servo hydraulic valve 30.

The hydraulic output of the valve 48 is coupled to chambers 49 and 50 of the cylinder 6 by means of passages 51 and 52. The pump 31 supplies the hydraulic fluid to the valve 48.

The function of the intermediate member 3 that is disposed between the vehicle body 1 and the wheel 4 is to act as a reaction mass so that the wheel driving servo system consisting of the pressure transducer 36 and the associated electrical circuitry coupled thereto and to the valve 48 and the cylinder 6 can apply larger forces to drive the wheel 4 into ground contact than are possible with the suspension systems described above. The wheel driving servo system is actuated by some measure of the wheel's position with respect to ground. Under steady state conditions, as when traversing a level road, the wheel driving servo supports the weight of the vehicle plus the reaction mass or the intermediate body 3. The constant force system which is composed of the pressure transducer 18, the cylinder 5 and the associated servo system electrical and hydraulic components thereof supports the car's weight. It may be a constant pressure system, such as described here, or one which derives its inputs from suitably oriented accelerometers, or any other system which operates to maintain a constant force to the body. The wheel driving servo may sense tire pressure or actual wheel position with respect to ground. Road discontinuities are removed by the constant force system's action on the passenger compartment, the wheel driving servo tending to maintain a constant pressure between the wheels of the vehicle and the road. The total allowable motion between the wheels and the passenger compartment for the three body suspension system of this invention is no greater than for the more conventional systems already considered. Total up and down wheel motion with respect to the body is wholly determined by the nature of the road discontinuities and the body-to-road clearance required. The latter for modern automobiles is of the order of 6 to 7 inches. It is then expected that the road discontinuities to be encountered are such that total wheel motion of the order of $\pm 4$ inches is ample to prevent bottoming. The reaction mass 3 should be of the order of three or four times the wheel mass.

Although the major part of undesired acceleration in present day automobiles is due to road disturbances which produce vertical motions, there is also undesired lateral motion of the passenger compartment due to bumps in the road. Lateral movement will result in passing over road discontinuities which produce a lateral skidding of the tire over the road surface. Lateral motion compensation is provided by means of a strain guage transducer 53 for sensing lateral motions of the wheel 4 between the wheel and the axle 17. The output of the strain guage transducer 53 is fed to a summing circuit 54 which has coupled thereto a reference voltage derived from the resistor and battery arrangement 55. Any difference output of the summing circuit 54 is fed into an amplifier 56, the output of which is coupled to a servo hydraulic valve 57 similar to the valves 30 and 48 and the hydraulic output of valve 57 is coupled to chambers 58 and 59 of the hydraulic device 12 by means of passages 60 and 61 to supply the counteracting forces.

A car and passengers negotiating the curve in the road are accelerating towards the center of the curve and unless suitable reaction forces are provided will slide or lean in their seats. When the road is banked to an angle $\theta = \tan^{-1}(v^2/gr)$ where $v$ is the speed of the vehicle, $r$ is the radius of curvature and $g$ is the gravitational constant, centrifugal force will be exactly balanced by the resultant of the car weight and road reaction as shown in FIG. 3. In FIG. 3, W is the weight of the car, R is the road reaction for zero radial motion when $F_a = F_b$. $F_a$ is the resultant of the weight and the reaction force R of a correctly banked road; $F_b$ equals the centrifugal force which is equal to $$\frac{W}{g}\frac{v^2}{r}$$

Then $$\theta = \tan^{-1}\frac{F_a}{w} = \tan^{-1}\frac{v^2}{gr}$$

Although most modern, high speed roadways are banked to compensate for centrifugal force at some nominal speed, the correction provided is not fully adequate for speeds less or greater than the nominal or design average. Furthermore, streets in cities and towns do not provide banking. This is a source of passenger discomfort which can be corrected by banking the automobile passenger compartment with respect to the plane of the wheels by the angle $\theta$. If $d_w$ is the distance between the left and right wheels (the treadwidth) and $x$ is the elevation of one wheel over the other required to achieve a bank angle $\theta$, then $x = (v^2/gr)d_w$. The radius of curvature $r$ is inversely proportional to $\phi$ the angular displacement of the steering wheel required to negotiate the curve. In FIG. 4 there is shown a block diagram 62 of the system required to derive a voltage proportional to $\phi$. The speedometer 62a is coupled to a potentiometer 63 which is energized by a battery 64. The output of the potentiometer 63 is a votlage proportional to the speed of the vehicle, $K_1V$. This voltage is coupled to a diode squaring network 65 to secure a voltage $K_2V^2$. This voltage is coupled to a potentiometer 66, the movable contact 67 of which is mechanically coupled to the steering column 68 of the vehicle so that the shaft position of the potentiometer arm 67 is proportional to the angular displacement $\phi$ of the steering column. This gives an output voltage $K_2V^2\phi$ which is the lean correction voltage required for the required vehicle banking during traversal of the curve and is fed into the amplifier 29 to provide the correct force for adjustment of the constant pressure servo system supporting the body.

The riding characteristics of an automobile ideally should be altered as a function of road speed. High speed turnpikes, medium speed mountain roads and city and town driving all require different automobile handling characteristics for optimum suspension performance. The design of the modern day automobile suspension is a compromise between optimum satisfaction of each of these conditions. For traversing roads with considerable hills and curves which are to be negotiated at moderate speeds, a stiff-feeling suspension minimizes lean and sway and the effects of acceleration and deceleration. Vehicles traveling on very high speed, concrete paved superhighways require less stiffness but still enough effective rigidity to minimize wind loading and transverse separation line thumping. Driving in town requires the softest suspension for absorbing the low frequency disturbances generated by the lowest speeds involved.

The adjustment of ride characteristics is a function of two variables, speed and road type. FIGURE 5 illustrates the overall servo compensation of the constant pressure system. The low speed compensation covers a wider frequency band than does the compensation for high speed operation of the vehicle. A low pass filter network may be added into the servo loop to achieve ride characteristic adjustment as shown in FIG. 6. The higher the gain at any given frequency of road disturbance and the wider the servo bandwidth, the softer will the suspension appear to be. FIG. 7 shows the circuitry required for the ride characteristic adjustment 28. The output of the polar relay 24 is coupled to a resistor 69. A capacitor 70 couples the resistor 69 to the input of a potentiometer 71. The shaft 72 of the movable contact arm 73 of potentiometer 71 is coupled to the speedometer 62a to vary the angular displacement of the shaft and thereby the resistance of the potentiometer in accordance with the speed of the vehicle. A potentiometer 74 is connected in series with the potentiometer 71 and is manually adjustable by the driver of the vehicle. As the resistance of potentiometers 71 and 74 is increased, the suspension would have the effect of stiffening since lower frequency signals would be attenuated by the network 28.

While I have described above the principles of my invention in connection with specific apparatus, it is to be clearly understood that this description is made only by way of example and not as a limitation to the scope of my invention as set forth in the objects thereof and in the accompanying claims.

I claim:

1. A suspension system for a vehicle for maintaining the body of said vehicle in a substantially stable condition during movement thereof comprising for each wheel of said vehicle a member disposed intermediate and separate from said body and said wheel, first variable suspension means disposed between said body and said member, first adjustable means coupled to said first variable suspension means to vary the suspending force of said first variable suspension means, second variable suspension means disposed between said member and said wheel and second adjustable means, separate from said first adjustable means, and coupled to said second variable suspension means to vary the suspending force of said second variable suspending means.

2. A suspension system for a vehicle according to claim 1 wherein said first and second suspension means comprise hydraulic suspension means.

3. A suspension system for a vehicle for maintaining the body of said vehicle in a substantially stable condition during movement thereof, comprising for each wheel of said vehicle a member disposed intermediate and separate from said body and said wheel, a first variable suspension means disposed between said body and said member, first adjustable means coupled to said first variable suspension means to vary the suspending force of said first variable suspension means, a second variable suspension means disposed between said member and said wheel and second adjustable means, separate from said first adjustable means, and coupled to said second variable suspension means to vary the suspending force of said second variable suspending means, means to sense changes in the displacement of said body and said wheel with respect to said member and means responsive to said changes exceeding given reference values to apply counteracting forces to said first and second suspension means.

4. A suspension system for a vehicle for maintaining the body of said vehicle in a substantially stable condition during movement thereof comprising for each wheel of said vehicle a member disposed intermediate said body and said wheel, first hydraulic suspension means disposed between said body and said member, a second hydraulic suspension means disposed between said member and said wheel, a pneumatic tire carried by said said wheel, a first pressure transducer to sense changes in said first hydraulic suspension causing changes in the displacement of said body relative said member, a second pressure transducer to sense changes in the air pressure of said tire causing changes in the displacement of said wheel relative said member, means coupled to the output of said first pressure transducer for comparing said output with a first given reference value and means responsive to said changes in said first hydraulic suspension means exceeding said reference value for applying a force to said first hydraulic suspension means counteracting said changes, means coupled to the output of said second pressure transducer for comparing said output with a second given reference value and means responsive to said changes in said air pressure exceeding said second given reference value for applying a force to said second hydraulic suspension means counteracting said changes in said air pressure.

5. A suspension system for a vehicle for maintaining the body of said vehicle in a substantially stable position during movement thereof comprising a pair of wheels and comprising for each wheel, a member disposed intermediate said body and said wheel, first hydraulic suspension means disposed between said body and said member, second hydraulic suspension means disposed between said member and said wheel, a first pressure transducer to sense changes in said first hydraulic suspension means caused by changes in the displacement of said body relative said member, first means to compare the change of displacement of said body relative said member with the change of displacement of said body relative the member of the other wheel, means responsive to said first comparison for producing an output when a given difference exists between said displacements and means responsive to said output for applying a counteracting force to said first hydraulic suspension means.

6. A suspension system for a vehicle according to claim 5 further including second means to compare the change of displacement of said body relative said member with a given reference value and means responsive to said first comparison for producing a control output proportional to the output of said second comparison when the difference between the relative displacement of said body with respect to said members equals or exceeds a given amplitude and means responsive to said control output for applying counteracting force to said first hydraulic suspension.

7. A suspension system for a vehicle according to claim 6 further including a polar relay, means coupling the output of said first and second comparison means to said relay whereby said relay passes the output of said second comparison means when the output of said first comparison means equals or exceeds said given amplitude, a first servo hydraulic valve, an amplifier coupling the output of said relay to said first servo hydraulic valve, a pump coupled to said first servo hydraulic valve, means coupling the hydraulic output of said first hydraulic valve to said first hydraulic suspension means whereby the output of said second comparison means will energize said first hydraulic valve and cause said first hydraulic valve to vary the pressure in said first hydraulic suspension means in accordance with the variations in the output of said second comparison means to maintain said body in said substantially stable condition.

8. A suspension system for a vehicle according to claim 7 further including pneumatic tires carried by said wheels, a second pressure transducer to sense changes in the air pressure of each said tire, third means to compare said changes in air pressure with the changes in air pressure of the tire of said other wheel, means responsive to said third comparison for producing an output when a given difference exists between the relative air pressures of said tires, fourth means to compare the air pressure changes of each said tire with a given reference value, a second polar relay, means coupling the outputs of third and fourth comparison means to said relay whereby said relay passes the output of said fourth comparison means when the output of said third comparison means equals or exceeds a given amplitude, a second servo hydraulic valve, a second amplifier coupling the output of said second relay to the input of said second hydraulic valve; means couping said pump to said second hydraulic valve, means coupling the hydraulic output of said second hydraulic valve to said second hydraulic suspension means whereby the output of said fourth comparison means will energize said second hydraulic valve and cause said second hydraulic valve to vary the pressure in said second hydraulic suspension means to counteract the changes in air pressure in said tire.

9. A suspension system for a vehicle for maintaining the body of said vehicle in a substantially stable condition during movement thereof and comprising for each wheel of said vehicle a member disposed intermediate said body and said wheel, a first variable suspension means disposed between said body and said member, a second variable suspension means disposed between said member and said wheel, means to sense changes in the displacement of said body and said wheel relative said member, means responsive to said changes exceeding given reference values to apply counteracting forces to said first and second suspension means, a third suspension means disposed intermediate said second suspension means and said wheel, means to sense changes in the lateral displacement of said wheel relative said second suspension means and means responsive to said changes exceeding a given reference value to apply counteracting forces to said third suspension means.

10. A suspension system for a vehicle according to claim 9 wherein said third suspension means comprises a hydraulic suspension means, and further including a strain guage transducer coupled to said wheel and the axle of said wheel to sense changes in the lateral displacement of said wheel relative said axle, means comparing the output of said transducer with a given reference value, a servo hydraulic valve, a hydraulic pump coupled to said hydraulic valve, an amplifier coupling said comparing means to said servo hydraulic pump, means coupling the hydraulic output of said hydraulic valve to said third hydraulic suspension means whereby the output of said comparison means will energize said hydraulic valve and cause said hydraulic valve to counteract said changes in lateral displacement.

11. A suspension system for a vehicle for maintaining the body of said vehicle in a substantially stable condition during movement thereof on a road, said vehicle including a steering wheel column and speed indication means, comprising for each wheel of said vehicle a member disposed intermediate said body and said wheel, first variable suspension means disposed between said body and said member, second variable suspension means disposed between said member and said wheel, means to sense changes in the displacement of said body and said wheel with respect to said member, means responsive to said changes exceeding a given reference value to apply counteracting forces to said suspension means, means coupled to the steering wheel column and speed indication means to derive an output proportional to the square of the speed of said vehicle and the angular displacement of said steering column required to counteract centrifugal forces exerted on said vehicle during the movement of said vehicle along a curve in said road, and means to apply said output to said force applying means to maintain said vehicle in said stable condition during movement along said curved road.

12. A suspension system for a vehicle according to claim 11 wherein said means coupled to said speed indication means include a first variable potentiometer to derive a voltage proportional to the speed of the vehicle, said means coupled to said steering wheel column include a second variable potentiometer, and further including a squaring network coupling the output of said first potentiometer to the input of said second potentiometer whereby the output of said second potentiometer is a voltage proportional to the square of the speed of said vehicle and the angular displacement of said steering wheel column.

13. A suspension system for a vehicle for maintaining the body of said vehicle in a substantially stable condition during movement thereof on a road under varying road conditions and speeds of said vehicle producing disturbing forces of varying frequencies on said vehicle, said vehicle including speed indication means, comprising for each wheel of said vehicle a member disposed intermediate said body and said wheel, first hydraulic suspension means disposed between said body and said member, second hydraulic suspension means disposed between said member and said wheel, means to sense changes in the displacement of said body and said wheel with respect to said member, means to compare said changes with a given reference value, means responsive to said changes exceeding a given reference value to apply counteracting forces to said first hydraulic suspension means, means coupled to said speed indication means and adjustable by the driver of said vehicle to derive an output proportional to a band of said forces of said disturbing frequencies desired to be counteracted at said varying road conditions and speeds and means to apply said output to said force applying means to maintain said vehicle in said stable condition during movement of said vehicle on said road.

14. A suspension system for a vehicle according to claim 13 wherein said means coupled to said speed indication means comprise a resistor-capacitor network including a first potentiometer coupled to said speed indication means and a second potentiometer coupled to the output of said first potentiometer and said network whereby said network will pass correcting signals of a wide band of frequencies when said vehicle is moving at relatively slow speeds and/or over favorable road conditions and will pass correcting voltages of a narrow band of frequencies when said vehicle is moving at relatively high speeds.

15. A suspension system for a vehicle for maintaining the body of said vehicle in a substantially stable condition during movement thereof comprising for each wheel of said vehicle a member disposed intermediate said body and said wheel, a hydraulic suspension means disposed between said member and said wheel, a pneumatic tire carried by said wheel, a pressure transducer directly coupled to said tire to sense changes in the air pressure of said tire, means coupled to the output of said pressure transducer for comparing said output with a given reference value, and means responsive to said changes in said air pressure for applying a force to said hydraulic suspension means counteracting said changes in said air pressure.

16. A suspension system for a vehicle for maintaining the body of said vehicle in a substantially stable condition during movement thereof comprising for each wheel of said vehicle a suspension means disposed intermediate said body and said wheel, means to sense changes in the lateral displacement of said wheel relative to the axle of said wheel, means coupled to the output of said sensing means for comparing the output of said sensing means with a given reference value, means responsive to said changes exceeding a given reference value to apply counteracting forces to said suspension means.

References Cited in the file of this patent

UNITED STATES PATENTS

| | | |
|---|---|---|
| 1,528,918 | Flader | Mar. 10, 1925 |
| 1,918,697 | Gruss | July 18, 1933 |
| 2,139,192 | Krekel | Dec. 6, 1938 |
| 2,503,378 | Cornwell | Apr. 11, 1950 |
| 2,593,040 | Lloyd | Apr. 15, 1952 |
| 2,623,758 | Cruz | Dec. 30, 1952 |
| 2,684,254 | Goss | July 20, 1954 |